Aug. 22, 1933.　　　R. J. GIVENS　　　1,923,086

AUTOMOBILE BRAKE SHIELD

Filed Oct. 8, 1928

R. J. Givens, INVENTOR

BY Victor J. Evans

ATTORNEY

Patented Aug. 22, 1933

1,923,086

UNITED STATES PATENT OFFICE 1,923,086

AUTOMOBILE BRAKE SHIELD

Robert J. Givens, Nampa, Idaho

Application October 8, 1928. Serial No. 311,105

15 Claims. (Cl. 188—218)

This invention relates to vehicle brakes and has especial relation to shields for preventing entrance of dirt and water into the drums of internal brakes so as to reduce wear, prevent screeching or other unpleasant noises and render the brakes more efficient in wet weather.

Another object of the invention is the provision of a brake shield which in addition to the above and other advantageous features, may be manufactured as an automobile accessory and quickly and easily applied by removing the vehicle wheel.

With the above and other objects in view, the invention further includes the following novel features and details of construction, to be hereinafter more fully described, illustrated in the accompanying drawing and pointed out in the appended claims.

In the drawing:—

Figure 1:
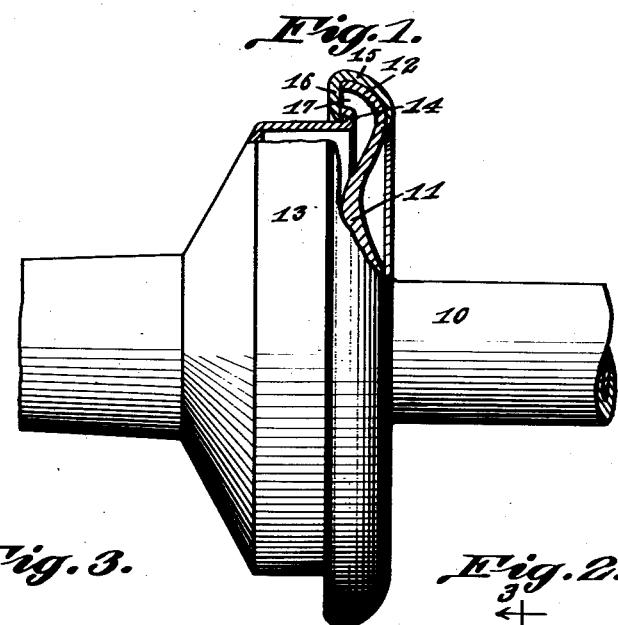
Figure 1 is a detail elevation partly in section showing the invention applied.
Figure 3:
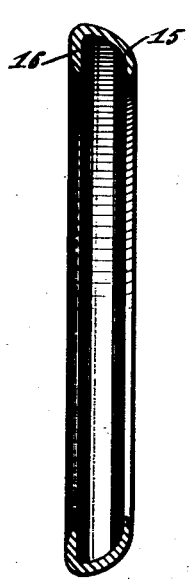
Figure 3 is a section on the line 3—3 of Figure 2.
Figure 2:
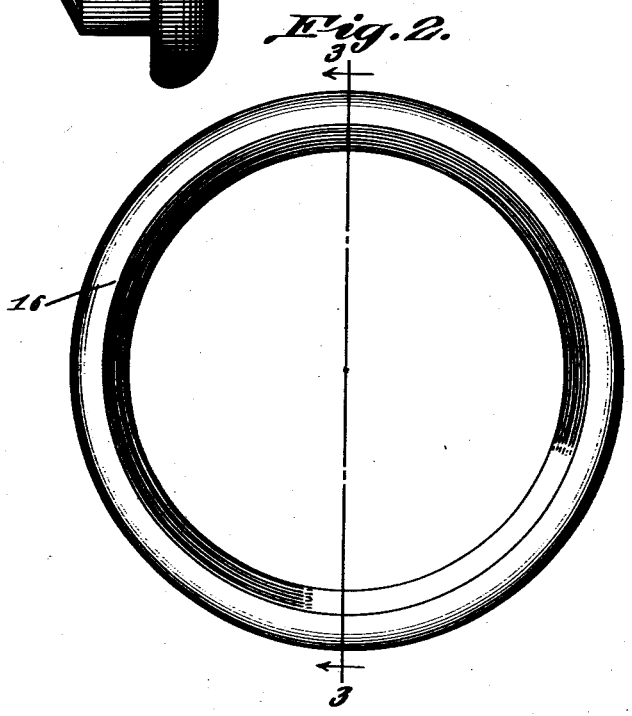
Figure 2 is an elevation of the shield per se.

Referring to the drawing in detail wherein like characters of reference denote corresponding parts, the reference character 10 indicates a portion of the rear axle housing of an automobile from which extends a stationary member or disk 11, the latter being provided around its periphery with a flange 12. The brake drum which is indicated at 13 encloses the brake bands (not shown) and the peripheral edge 14 of this drum extends within and is slightly spaced from the edge of the flange 12. This construction permits of the entrance of dirt and water into the drum with resultant injury to the brake band linings.

The present invention overcomes these disadvantages through the use of a shield. This shield comprises an annular member which is substantially channel-shaped in cross section and provides a curved wall 15 and a relatively straight wall 16 which extends therefrom. The shield is formed of rubber or other elastic material and is positioned with the curved wall 15 tightly gripping the flange 12 so as to securely and frictionally hold the shield in place. This is shown in Figure 1 of the drawing, wherein the wall 16 extends inwardly over the adjacent edge of the brake drum and effectually closes the space 17 between the edge of the flange 12 and the edge 14 of the brake drum.

The invention is susceptible of various changes in its form, proportions and minor details of construction and the right is herein reserved to make such changes as properly fall within the scope of the appended claims.

Having described the invention what is claimed is:—

1. A dust shield for vehicle brakes comprising in combination with a stationary member, a rotatable brake drum positioned adjacent to and disposed concentrically with the stationary member, an annular channel-shaped rubber member carried by the stationary member and overlapping the drum to close the space between the peripheries of the stationary member and drum, said rubber member being normally of lesser diameter than the diameter of the stationary member.

2. A dust shield for vehicle brakes comprising in combination with a stationary member, a rotatable brake drum positioned adjacent to and disposed concentrically with the stationary member, an elastic annular channel-shaped member carried by the stationary member and overlapping the drum to close the space between the peripheries of the stationary member and drum.

3. A dust shield for vehicle brakes comprising in combination with a stationary member, a rotatable brake drum positioned adjacent to and disposed substantially concentrically with the stationary member, a peripheral flange carried by the stationary member and extending over the peripheral edge of the drum, and an annular channel-shaped shield frictionally engaging the flange and extending inwardly toward the edge of the drum, said inwardly extending portion including a flexible wall.

4. As a new article of manufacture, a shield for internal vehicle brakes comprising an annular channel-shaped member formed of elastic material and including a transversely curved gripping wall and an inwardly disposed substantially straight wall extending therefrom.

5. A seal for excluding foreign matter from brake enclosures, comprising a resilient annular member including a gripping portion adapted by its inherent resilience to retain the member on said brake enclosure, and a flexible wall portion extending inwardly from said gripping portion and terminating in a feather edge.

6. A seal for enclosed brake structures, comprising in combination relatively rotatable and non-rotatable brake housing members having adjacent annular margins, and a resilient annular member having a portion sprung over one of said margins and a portion connected thereto spanning the space between said adjacent margins.

7. A seal for enclosed brake structures, comprising relatively rotatable and non-rotatable brake housing members, annular flanges projecting from said members with their edges in substantial vertical alignment, and a channel-shaped shield having a vertical portion engaging said edges and having a running fit with one of said members to prevent ingress of foreign matter to the space between said flanges.

8. A seal for enclosed brake structures, comprising relatively rotatable and non-rotatable brake housing members, annular flanges projecting from said members with their edges in substantial vertical alignment, and an annular resilient shield spanning the space between said flanges to prevent ingress of foreign material thereto, said shield having a portion thereof gripping one of said members for holding the shield in position by means of its inherent resilience.

9. A shield for brake enclosing members having an annular opening therebetween, comprising a flexible annular member to span said opening to prevent ingress of dirt and water thereto, and resilient means for retaining said flexible member in position.

10. A dust shield for vehicle brakes, comprising in combination with a drum and a flange plate affording an enclosure for a brake, an annular member carried by one of said brake enclosing members and overlapping the other of said enclosing members for sealing the space therebetween.

11. A resilient rubber ring for sealing the annular space between enclosed brake housing members, said ring being channel-shaped in cross-section, the wall forming one leg of said channel being tapered to a feather edge.

12. A resilient rubber ring for sealing the annular space between enclosed brake housing members, said ring being channel-shaped in cross-section.

13. Brake mechanism comprising a brake drum and, in combination therewith, a backing plate having a channel-section portion at its periphery encircling the edge of the brake drum, and a separate annular channel-shaped member encircling the periphery of the backing plate and forming a relatively close joint with the external surface of the brake drum.

14. In combination, a brake mechanism for vehicle wheels including a drum having its inner edge rounded to provide an outstanding bead, a brake housing plate arranged over the inner face of the drum, and which plate has a peripheral outstanding flange disposed over the bead, and means fixed to the flange of the plate for closing the space between the said plate and the bead of the drum.

15. The combination with a vehicle wheel brake comprising annular concentric members having adjacent edges slightly spaced in a radial direction, of an elastic member partly disposed on the edge of larger diameter and having a portion directed toward the edge of the other member.

ROBERT J. GIVENS.